United States Patent [19]

Collins

[11] Patent Number: 4,513,037

[45] Date of Patent: Apr. 23, 1985

[54] MULTILAYERED HOLLOW POLYCARBONATE CONTAINERS

[75] Inventor: Patrick C. Collins, Pittsfield, Mass.

[73] Assignee: General Electric Company, Mt. Vernon, Ind.

[21] Appl. No.: 566,513

[22] Filed: Dec. 29, 1983

[51] Int. Cl.³ .......................... B65D 1/00; B32B 27/36
[52] U.S. Cl. ........................................ 428/35; 428/332; 428/336; 428/337; 428/412; 428/480; 428/500; 428/522
[58] Field of Search .................. 428/412, 35, 480, 332, 428/336, 337, 500, 522; 528/128; 525/67

[56] References Cited

U.S. PATENT DOCUMENTS

| | | | |
|---|---|---|---|
| 4,001,184 | 1/1977 | Scott | 528/128 X |
| 4,121,014 | 10/1978 | Shaffer | 428/412 |
| 4,204,047 | 5/1980 | Margotte et al. | 525/67 |
| 4,294,953 | 10/1981 | Quinn et al. | 528/128 |
| 4,327,137 | 4/1982 | Sawa et al. | 428/35 |
| 4,475,241 | 10/1984 | Mueller et al. | 428/35 X |

*Primary Examiner*—Thomas J. Herbert
*Attorney, Agent, or Firm*—Myron B. Kapustiji; Martin B. Barancik

[57] ABSTRACT

Multilayered hollow polycarbonate containers comprised of:

(i) at least one inner polycarbonate layer;
(ii) at least one outer polycarbonate layer; and
(iii) at least one intermediate layer between said inner polycarbonate layer and said outer polycarbonate layer comprised of a thermoplastic resin exhibiting gas-barrier properties.

The containers are formed by coextrusion blow-molding.

15 Claims, No Drawings

MULTILAYERED HOLLOW POLYCARBONATE CONTAINERS

BACKGROUND OF THE INVENTION

The use of hollow polycarbonate containers such as bottles, jars and packages for storing food, beverages, and other perishable items has been finding increased use. Polycarbonate containers offer several advantages over comparable glass containers. These advantages include lighter weight, and greater impact strength and resistance to breakage. These advantages are achieved without any sacrifice in the optical clarity and transparency of the polycarbonate containers as compared with glass containers.

However, polycarbonate containers suffer from the disadvantage of being relatively more permeable to gas transport than glass containers. Thus, for example, glass containers are better for storing carbonated beverages as they are better at keeping in the $CO_2$ than polycarbonate containers. Likewise, glass containers are more effective than polycarbonate containers in keeping out oxygen from juices and other perishable foods, thereby preventing these perishable items from spoilage for longer periods of time than polycarbonate containers.

In order to remedy this relatively high gas permeability of polycarbonate containers U.S. Pat. No. 4,327,137 discloses utilizing a two layer hollow container comprised of a polycarbonate inner layer and a polyester outer layer. The polyester layer functions as a gas-barrier layer. While such two layer containers are effective in reducing the gas transport between the interior of the container and the outside environment, they nevertheless suffer from several disadvantages. Firstly, the exposed polyester layer is subject to hydrolytic degradation at conditions of high humidity and high temperature. These conditions are usually present during washing of the containers. The polyester is also subject to shrinkage caused by crystalline change at high temperatures. Secondly, the polyester is quite sensitive to hot caustic solutions. Since most reusable bottles or containers are washed with a hot cleaning solution containing caustic, these two layer containers are unsuitable for use as reusable containers.

It is, therefore, an object of the instant invention to provide polycarbonate containers which exhibit improved gas-barrier properties and improved resistance to hydrolysis and attack by caustic agents.

SUMMARY OF THE INVENTION

The instant invention is directed to polycarbonate containers formed by direct blow-molding comprised of (i) at least one inner polycarbonate containing layer, (ii) at least one outer polycarbonate containing layer, and (iii) at least one intermediate layer disposed between said inner and outer polycarbonate containing layers and laminated to said outer and inner layers, said intermediate layer being comprised of a thermoplastic resin exhibiting gas-barrier properties.

DESCRIPTION OF THE INVENTION

It has been found that polycarbonate containers can be provided by direct blow-molding which exhibit improved gas-barrier properties, and which can withstand washing at conditions of high temperatures and high humidity, and with hot caustic solutions without suffering any significant deleterious affects upon their mechanical or gas-barrier properties.

The instant polycarbonate containers are comprised of:
(i) at least one inner polycarbonate containing layer or ply;
(ii) at least one outer polycarbonate layer or ply; and
(iii) at least one intermediate layer or ply disposed between said outer and inner polycarbonate plies comprised of a thermoplastic resin exhibiting gas-barrier properties.

The polycarbonate resins utilized in the instant invention are well known in the art and are generally commercially available materials. These polycarbonates, as well as methods for their manufacture, are described, inter alia, in U.S. Pat. Nos. 3,161,615, 3,220,973, 3,312,659, 3,312,660, 3,313,777, 3,666,614 and 3,939,672, all of which are incorporated herein by reference. The polycarbonate resins may conveniently be prepared by the reaction of a dihydric phenol with a carbonate precursor via the interfacial polymerization process. Typically, the dihydric phenols utilized may be represented by the general formula

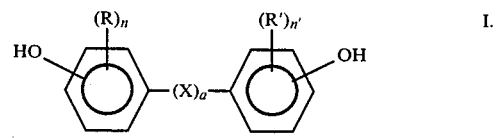

wherein:
X is selected from divalent hydrocarbon radicals,

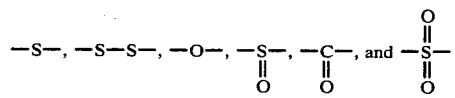

radicals;
each R is independently selected from halogen radicals, monovalent hydrocarbon radicals, and monovalent hydrocarbonoxy radicals;
each R' is independently selected from halogen radicals, monovalent hydrocarbon radicals, and monovalent hydrocarbonoxy radicals;
a is zero or one; and
n and n' are independently selected from whole numbers having a value of from 0 to 4 inclusive.

The divalent hydrocarbon radicals represented by X include alkylene radicals, alkylidene radicals, cycloalkylene radicals, cycloalkylidene radicals, and arylene radicals. Preferably the divalent hydrocarbon radicals represented by X are those containing from 1 to about 15 carbon atoms. Some illustrative non-limiting examples of these radicals include ethylene, propylene, butylene, isopropylene, amylene, ethylidene, propylidene, amylidene, cyclohexylene, cyclohexylidene, phenylene, naphthylene, and methylphenylene.

When a is zero the two aromatic rings are directly joined without any intervening alkylene or other bridging group.

The halogen radicals represented by R and R' include chlorine, bromine and iodine, with chlorine and bromine being the preferred halogen radicals.

The monovalent hydrocarbon radicals represented by R and R' include alkyl radicals, cycloalkyl radicals, aryl radicals, alkaryl radicals, and aralykyl radicals. The preferred monovalent hydrocarbon radicals are those containing from 1 to about 15 carbon atoms. Some illustrative non-limiting examples of these monovalent hydrocarbon radicals are methyl, ethyl, propyl, butyl, isobutyl, tertiarybutyl, pentyl, neopentyl, cyclobutyl, cyclohexyl, phenyl, napthyl, butylphenyl, dimethylphenyl, and the like.

The monovalent hydrocarbonoxy radicals represented by R and R' may be represented by the general formula OR'' wherein R'' is a monovalent hydrocarbon radical of the type described hereinafore.

When more than one R substituent is present on the aromatic ring they may be the same or different. The same is true of the R' substituent.

Typical of some of the dihydric phenols that may be utilized to prepare the polycarbonate resins useful in the practice of the instant invention are:
2,2-bis(4-hydroxyphenyl)propane (bisphenol-A);
bis(4-hydroxyphenyl)methane;
2,2-bis(4-hydroxy-3-methylphenyl)propane;
4,4-bis(4-hydroxyphenyl)heptane;
2,2-bis(4-hydroxy-3,5-dichlorphenyl)propane;
4,4-thiodiphenol;
3,3-dichloro-4,4'-dihydroxydiphenyl; and the like.
Other dihydric phenols are also available and are disclosed in U.S. Pat. Nos. 2,999,835; 3,028,365 and 3,334,154, all of which are incorporated herein by reference. Bisphenol-A is the preferred dihydric phenol.

It is, of course, possible to employ two or more different dihydric phenols rather than utilizing a single dihydric phenol in the preparation of the polycarbonate resins.

In addition to linear polycarbonates obtained by reacting the aforedescribed dihydric phenol with a carbonate precursor, branched polycarbonate resins may also be utilized. The branched polycarbonate resins may be prepared by reacting (i) at least one dihydric phenol of the type described hreinafore, (ii) a carbonate precursor, and (iii) a minor amount of a polyfunctional organic compound. The polyfunctional organic compounds used in making the branched polycarbonates are well known in the art and are disclosed, for example, in U.S. Pat. Nos. 3,525,712; 3,541,049; 3,544,514; 3,635,895; 3,816,373; 4,001,184; 4,294,953 and 4,204,047, all of which are hereby incorporated herein by reference. These polyfunctional organic compounds are generally aromatic in nature and contain at least three functional groups which may be, for example, hydroxyl, carboxyl, carboxylic anhydride, haloformyl, and the like. Some illustrative non-limiting examples of these polyfunctional compounds include trimellitic anhydride, trimellitic acid, trimellityl trichloride, 4-chloroformyl phthalic anhydride, pyromellitic dianhydride, mellitic acid, mellitic anhydride, trimesic acid, benzophenonetetracarboxylic acid, benzophenonetetracarboxylic anhydride, and 4,6-dimethyl-2,4,6-tri-(4-hydroxyphenyl)-heptene-2. The amount of this polyfunctional organic compound or branching agent used is in the range of from about 0.05 to about 2 mole percent based on the amount of dihydric phenol employed, and preferably from about 0.1 to about 1 mole percent.

The carbonate precursor employed may be a carbonyl halide, a carbonate ester, or a bishaloformate. The carbonyl halides which may be employed are carbonyl bromide, carbonyl chloride, and mixtures thereof. Typical of the carbonate esters which may be employed herein are diphenyl carbonate; di(halophenyl)carbonates such as di(chlorophenyl)carbonate, di(bromophenyl)carbonate, di(trichlorophenyl)carbonate, etc.; di(alkylphenyl) carbonates such as di(tolyl)carbonate, etc.; di(naphthyl)carbonate; di(chloronaphthyl)carbonate; phenyl tolyl carbonate; chlorophenyl chloronaphthyl carbonate, etc., or mixtures thereof. The haloformates suitable for use herein as carbonate precursors include bis-haloformates of dihydric phenols such as bis-chloroformates of hydroquinone; bis-haloformates of glycols such as bis-haloformates of ethylene glycol, neopentyl glycol, polyethylene glycol, etc. While other carbonate precursors will occur to those skilled in the art, carbonyl chloride, also known as phosgene, is the preferred carbonate precursor.

In utilizing the interfacial polymerization process the polycarbonate polymers of this invention are generally prepared by employing a chain terminating agent and a catalyst, and an inert organic solvent which serves to dissolve the polycarbonate as it is formed.

The polycarbonate resins useful in the practice of the instant invention generally have a number average molecular weight in the range of from about 10,000 to about 60,000.

The intermediate layer which is disposed between the inner and outer polycarbonate layers is comprised of a thermoplastic material which exhibits gas-barrier properties. This material must also be compatible with the polycarbonate resin and should also be melt laminable directly to the polycarbonate plies without the use of any adhesive, i.e., the inner polycarbonate ply, the intermediate ply, and the outer polycarbonate ply are melt laminable. Furthermore, this material must lend itself to a coextrusion blow molding process.

The term gas-barrier properties means, within the context of the instant invention, that the resinous material has a relatively low gas permiability compared to the gas permiability of polycarbonate. That is to say, the material is relatively more effective than polycarbonate in substantially retarding or slowing gas transport or permiation therethrough.

Thus, for example, a 9.5 mil thick cast polycarbonate film has a $CO_2$ permiability of 1022 cc/mil/100 sq. in./day/atm.; an $O_2$ permiability of 185 cc/mil/100 sq. in./day/atm.; and a $H_2O$ permiability of 4.3 gms/mil/100 sq. in./day/atm. Polyethylene terephthalate, which is one of the materials which may be used for the intermediate layer in the multilayer containers of the instant invention, has a $CO_2$ permiability of 20 cc/mil/100 sq. in./day/atm.; an $O_2$ permiability of 10 cc/mil/100 sq. in./day/atm; and a $H_2O$ permiability of 4/gms/mil/100 sq. in./day/atm., in the amorphous form.

Some illustrative non-limiting examples of thermoplastic resins exhibiting gas-barrier properties, being compatible with polycarbonate, being melt laminable to polycarbonate, and lending themselves to coextrusion blow molding include the polyesters, nylons, polyvinyl chloride, polyvinylidene chloride, polyvinyl alcohol, acrylonitrile, and copolymers of ethylene and vinyl alcohol such as those made by hydrolyzing a copolymer of vinyl acetate and ethylene.

Particularly useful thermoplastic polyesters are the polyalkylene terephthalate resins and copolyesters of cycloaliphatic diols and dibasic carboxylic acids. The polyalkylene terephthalate resins may be represented by the following structural formula

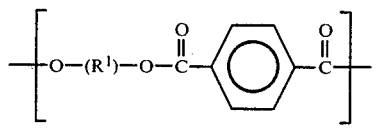

wherein R¹ is an alkylene radical such as methylene, ethylene, propylene, butylene, and the like. A particularly useful polyalkylene terephthalate is polyethylene terephthalate.

The copolyesters derived from a cycloaliphatic diol and at least one dibasic carboxylic acid may be prepared by condensing either the cis or trans isomer (or a mixture thereof) of 1,4-cyclohexanedimethanol with at least one hexacarbocycli dicarboxylic acid (inclusding esters or halides thereof) so as to produce a highly polymeric, high melting linear polyester having a molecular structure principally containing recurring units having the following formula

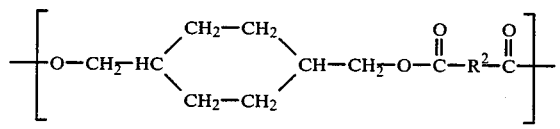

wherein the substituted cyclohexane ring is selected from the group consisting of the cis and trans isomers thereof and R² represents an organic radical containing from 6 to 20 carbon atoms which is the decarboxylated residue derived from a hexacarbocyclic dicarboxylic acid.

The preparation of these copolyesters, as well as the copolyesters themselves, are disclosed in U.S. Pat. Nos. 2,465,319; 2,901,466 and 3,047,539, all of which are hereby incorporated by reference.

A particularly useful copolyester of this type is a random copolymerized polyester of cyclohexane dimethylol and terephthalic and isophthalic acids. Such a polyester contains repeating structural units represented by the general formula

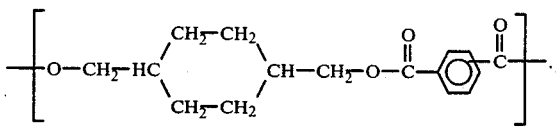

These thermoplastic polyesters are readily commercially available, or they may be prepared by known methods.

Nylons are polyamides which are described, along with methods for their preparation in Bannermann, D. G., and E. E. Magat, "Polyamides and Polyesters," Chap. VII in C. E. Schildkencht, ed., *Polymer Processes*, Interscience Publishers, New York, 1956; Floyd, D. E., *Polyamide Resins*, Reinhold Publishing Corp. New York, 1958; Inderfurth, K. H., *Nylon Technology*, McGraw-Hill Book Co., New York, 1953; and Munden, A. R., "Polyamide Fibers," Chap. 17 in R. Hill, ed., *Fibers from Synthetic Polymers*, Elsevier Publishing Co., New York, 1953.

Particularly useful nylons are those derived from diamines and dibasic acids, such as for example the polymer of hexamethylenediamine and adipic acid and the polymer of hexamethylenediamine and sebacic acid. Other useful nylons are polycaprolactam and poly(w-aminoundecanoic acid). These nylons are commercially available, as from example from the E. I. Du Pont Company.

Polyvinyl alcohol is prepared by the alcoholysis of poly(vinyl acetate) and contains repeating structural units of the formula

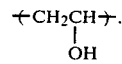

The preparation of polyvinyl alcohol is more fully described in Billmeyer, F. W., *Textbook of Polymer Science*, pp. 406–411, Interscience Publishers, New York, N. Y., 1962. Polyvinyl alcohol is commercially readily available. Both polyvinyl chloride and polyvinylidene chloride are well known resins which are commercially readily available. Polyvinyl chloride and polyvinylidene-chloride, as well as methods of their manufacture are described in Smith, W. M., *Vinyl Resins*, Reinhold Publishing Corp., New York, 1958; and Schildknecht, C. E., *Vinyl and Related Polymers*, John Wiley & Sons, New York, 1952, Chap. VI.

Acrylonitrile resins can be made either by the direct catalytic addition of HCN to acetylene, or by the addition of HCN to the ethylene oxide to give ethylene cyanhydrin, followed by dehydration. The monomer is soluble in water to the extent of about 7.5% at room temperature, and polymerization is usually carried out in an aqueous solution by means of redox initiation. The polymer precipitates from this system as a fine powder. Polyacrylonitrile resins are commercially available. These polymers, as well as the methods for their preparation are well known and are described, for example, in Daum, G. A., "Nitrile and Polyacrylate Rubbers" Chap. 11, in Morton, M., ed., *Introduction to Rubber Technology*, Reinhold Publishing Corp., New York, 1959, and Sitty, M. *Acrylonitrile*, 1965, Both of which are incorporated herein by reference.

The copolymers of ethylene and vinyl alcohol are obtained by the saponification of a random copolymer of vinyl acetate and ethylene. These copolymers are commercially available and are described, for example, in U.S. Pat. No. 3,585,177, which is hereby incorporated by reference.

Particularly useful resins, from the standpoint of offering a particularly good mix of excellent properties such as good gas-barrier properties, compatibility with polycarbonate, ability to melt bond or laminate with polycarbonate, and ability to be blow molded, are the thermoplastic polyesters, copolymers of ethylene and vinyl alcohol, and acrylonitriles. Particularly useful polyesters are the polyalkylene terephthalates, with polyethylene terephthalate being a particularly useful polyalkylene terephthalate, and polyesters of cyclohexane dimethylol and terephthalic and isophthalic acids.

The hollow containers of the instant invention are comprised of at least three layers or plies bonded to each other. These three layers include at least one central or intermediate layer which is comprised of a resin exhibiting gas-barrier properties; at least one inner layer comprised of polycarbonate which is bonded to the inner face of the central layer; and at least one polycarbonate outer layer which is bonded to the outer face of the central layer.

In the multilayer hollow containers of the instant invention the various layers are melt bonded or melt laminated to each other. Thus, the inner polycarbonate layer is melt bonded to the central layer, while the outer polycarbonate layer is likewise melt bonded to the central layer.

The containers of the instant invention may be conveniently prepared by coextrusion blow-molding. More specifically, these containers may be made by a method comprising first coextruding the various layers of the material, and blow-molding the parison prior to its solidification with intra-die melt lamination taking place. In a particularly preferred method, wherein the containers are comprised of three plies, i.e., an inner polycarbonate ply, an intermediate ply comprised of a resin exhibiting gas-barrier properties, and an outer polycarbonate ply, the containers are formed by employing three extruders. Two of these extruders extruding polycarbonate while the third extruder extrudes the resin exhibiting gas-barrier porperties. These three extruders extrude three layers of a generally cylindrical parison which is then blow-molded, prior to solidification, with intra-die melt lamination occuring.

The combined minimum thickness of the layers forming the wall of the container is controlled by the fact that this wall should be thick enough to provide sufficient strength, stiffness, rigidity, and integrity to serve as an effective enclosure and container for a variety of materials, such as liquids, placed within the container. Generally this minimum thickness is about 10 mils, and preferably about 20 mils. The maximum combined thickness of the layers forming the walls of the container is not critical but is governed by such secondary considerations as appearance, cost, weight, and the like. As a non-limiting illustration bottles formed from the instant three layer structure generally may have a combined wall thickness of from about 30 to about 70 mils.

The minimum thickness of the central or intermediate layer is such that said layer is effective in functioning as a gas-barrier layer, i.e., exhibiting substantial gas-barrier properties. This thickness depends, to a certain degree, upon the particular resin utilized for the gas-barrier central layer. Generally, however, this minimum thickness is about 0.5 mil, and preferably about 1 mil. The upper thickness range of the intermediate layer is not critical but is controlled by such secondary considerations as cost, ease of fabrication, appearance, bottle weight, and the like.

The minimum thickness of the inner and outer polycarbonate containing layers is generally a thickness which is effective in protecting the central gas-barrier resinous layer from the deleterious affects of external environmental factors such as heat, high humidity, caustic and other washing solutions, and the like to which the resinous material forming the intermediate layer may be sensitive. Generally, this minimum thickness if about 1 mil, and preferably about 5 mils. The upper thickness range of the outer and inner polycarbonate layers is not critical but is controlled by such secondary factors as cost, weight, appearance, ease of fabrication, and the like.

In general the inner polycarbonate layer may have a thickness of from about 1 to about 50 mils, preferably from about 2 to about 20 mils. The outer polycarbonate layer may generally have a thickness of from about 1.0 to about 60 mils, preferably from about 2 to about 40 mils. The intermediate layer may generally have a thickness of from about 0.5 to about 50 mils, preferably from about 1 to about 20 mils.

The polycarbonate resin which comprises the inner and outer layers of the instant hollow containers may optionally have admixed therewith the commonly known and used additives such as antioxidants; hydrolytic stabilizers such as the epoxides; ultraviolet radiation stabilizers such as the benzophenones, benzotriazoles, and the like; colorants; color stabilizers such as the organophosphites; impact modifiers; inert fillers such as glass, talc, mica, clay, and the like; and mold release agents.

DESCRIPTION OF THE PREFERRED EMBODIMENT

The following examples are set forth to illustrate the instant invention and are not to be construed as limiting the scope of the invention thereto. Unless otherwise indicated all parts and percentages are on a weight basis.

EXAMPLE I

This example illustrates the preparation of a 1 liter bottle comprised of an inner polycarbonate layer, an outer layer of polycarbonate resin, and an intermediate layer comprised of polyester resin.

Utilizing a multi-layer coextrusion blow molding machine containing three extruders, two of which extrude polycarbonate resin and one of which extrudes polyester resin, three layers of cylindrical parison are extruded by coextrusion at a resin temperature of about 280° C. for the polycarbonate resin and about 280° C. for the polyester resin at a combined extrusion rate of about 28.9 kilograms per hour. The resin for the inner and outer layers is a branched polycarbonate resin derived from bisphenol-A and phosgene and marketed by the General Electric Company under the designation LEXAN ®154 resin. The polyester resin forming the central or intermediate layer is polyethylene terephthalate having an intrinsic viscosity of 1.04 dl/gm and marketed by the Goodyear Chemical Company under the designation CLEARTUF 1002. The parison, which is intra-die melt laminated, is nipped with a pair of metal molds for a 1 liter round bottle with a neck diameter of 28 mm. The parison is then blow molded.

The physical properties of the resultant 1 liter bottle are set forth in Table I.

EXAMPLE II

This example illustrates the preparation of teh same type of 1 liter bottle as in Example 1 except that the intermediate layer is formed of a different polyester resin than that utilized in Example I.

Utilizing a multi-layer coextrusion blow molding machine containing three extruders, two of which extrude polycarbonate resin and the third extruding polyester resin, three layers of cylindrical parison are extruded by coextrusion at a resin temperature of about 280° C. for the polycarbonate resin and about 280° C. for the polyester resin. The polycarbonate resin for the inner and outer layers is the branched polycarbonate resin used in Example I. The polyester resin of the central or intermediate layer is a copolyester of cyclohexane dimethylol and terephthalic and isophthalic acids marketed under the tradename KODAR by the Eastman Kodak Company. The parison, which is intra-die melt laminated, is nipped with a pair of metal molds for a 1 liter round bottle having a neck diameter of 38 mm. The parison is then blow molded into the 1 liter bottle.

The physical properties of the resultant 1 liter bottle are set forth in Table I.

TABLE I

| PROPERTY | EXAMPLE I | EXAMPLE II |
|---|---|---|
| Layer Thickness[a] | | |
| Inner Layer | 8–9 mils | 6–7 mils |
| Central Layer | 10 mils | 6–7 mils |
| Outer Layer | 28 mils | 19 mils |
| Weight of Polycarbonate resin in Bottle | 64.4 gms. | 60.6 gms |
| Weight of Barrier resin in Bottle | 20.5 gms. | 17.1 gms |
| $O_2$ Permiability[b] | | |
| Total Bottle with a surface area of 74.7 sq. in. | 0.384 | 0.598 |
| Sidewalls only with a surface area of 65.5 sq. in. | 0.558 | 0.378 |
| $CO_2$ Permiability[b] | | |
| Total Bottle with a surface area of 74.7 sq. in. | 6.4 | 13.5 |
| Sidewalls only with a surface area of 65.5 sq. in. | 5.8 | 10.5 |
| $H_2O$ Permiability[c] | | |
| Total Bottle with a surface area of 74.7 sq. in. | 0.094 | 0.097 |
| Sidewalls only with a surface area of 65.5 sq. in. | 0.085 | 0.078 |
| Impact Strength[d] | | |
| Sidewall | 121 ft-lbs | 118 ft-lbs |
| Bottom | 8 ft-lbs | 9 ft-lbs |

[a]The thickness of the three layers in the sidewalls of the bottles is determined by photomicrographic analysis of a cross section of the sidewall of the bottle taken near the middle of the bottle
[b]The gas permeability is measured in cc/mil/100 sq. in./day/atm. The permeability is measured at room temperature and at one atmosphere of pressure.
[c]The $H_2O$ permeability is measured in g/mil/100 sq. in/day/atm. The permeability is measured at room temperature and at one atmosphere of pressure.
[d]The bottles are subjected to a puncture impact analysis using an Instron Variable Rate High Speed Impact Tester. The test bottle is affixed over an 8 cm. diameter support ring and impacted with a 2 cm. diameter traveling at 15 mph. Two sets of bottles are impacted, one set in the middle of the sidewall, the other set in the middle of the bottom In order to evaluate the ability of the bottles to be washed using the hot, dilute caustic systems normally used in the returnable/reusable bottle industry, the bottles of Examples I and II were immersed in a 3% solution of a caustic cleaner at 120° F. Table II illustrates the results.

TABLE II

| EXAMPLE NO. | TIME TO FAILURE IN 3% CAUSTIC |
|---|---|
| I | Greater than 2.5 hours but less than 8 hours |
| II | Small stress crack, but no breakage after 8 hours |

The dimensional stability of the bottles after 8 hours soaking in the 3% caustic is determined. The results are set forth in Table III.

TABLE III

| DIMENSION | EXAMPLE I | | EXAMPLE II | |
|---|---|---|---|---|
| | Before | After | Before | After |
| Base diameter | 3.41 in. | 3.40 in. | 3.39 in. | 3.37 in. |
| Middle diameter | 3.44 in. | 3.44 in. | 3.47 in. | 3.46 in. |
| Neck diameter | 1.55 in. | 1.53 in. | 1.55 in. | 1.61 in. |
| Length | 10.40 in | 10.39 in. | 10.36 in. | 10.38 in. |

The bottle of Example II was annealed by at 250° F. for two hours. The annealed bottle was then placed in a 3% caustic cleaner at 120° F. The results of this test are set forth in Table IV.

TABLE IV

| EXAMPLE No. II | Hours to failure |
|---|---|
| Unannealed | 8 |
| Annealed | 144* |

*Test discontinued after 144 hours.

EXAMPLE III

This example illustrates the preparation of a 500 milliliter jar comprised of an inner polycarbonate layer, an intermediate acrylonitrile layer, and an outer polycarbonate layer.

Utilizing a multi-layer coextrusion blow molding machine containing three extruders, two of which extrude polycarbonate resin and one of which extrudes acrylonitrile resin, three layers of cylindrical parison are extruded by coextrusion at a resin temperature of about 250° C. for the polycarbonate resin and about 230° C. for the acrylonitrile resin. The resin of the inner and outer layers is the branched polycarbonate resin of Example I. The acrylonitrile resin forming the intermediate layer is marketed by the Standard Oil Company of Ohio under the designation BAREX 210. The parison, which is intra-die melt laminated, is nipped with a pair of molds for a 500 milliliter round jar. The parison is then blow molded to form the 500 milliliter jar.

The physical characteristics of this jar are set forth in Table V.

EXAMPLE IV

This example illustrates the preparation of a 500 milliliter jar composed of an inner layer of polycarbonate resin, an intermediate layer of a copolymer of vinyl alcohol and ethylene, and an outer layer comprised of polycarbonate resin.

Utilizing a multi-layer coextrusion blow molding coextrusion machine containing three extruders, two of which extrude the polycarbonate resin and one of which extrudes the copolymer of vinyl alcohol and ethylene, three layers of cylindrical parison are extruded by coextrusion at a resin temperature of about 250° C. for the polycarbonate resin and about 240° C. for the copolymer of ethylene and vinyl alcohol. The polycarbonate resin utilized for the inner and outer layers is the branched polycarbonate of Example I, while the copolymer of ethylene and vinyl acetate is marketed by the Kuraray Company, Ltd., of Japan, under the designation EVAL-F. The parison, which is intra-die melt laminated, is nipped with a pair of metal molds for a 500 milliliter round jar. The parison is then blow molded to form the 500 ml. round jar.

The physical characteristics of this jar are set forth in Table V.

TABLE V

| PROPERTY | EXAMPLE III | EXAMPLE IV |
|---|---|---|
| Layer Thickness | | |

TABLE V-continued

| PROPERTY | EXAMPLE III | EXAMPLE IV |
| --- | --- | --- |
| Inner Layer | 6.5 mils | 6.5 mils |
| Central Layer | 7.4 mils | 2.4 mils |
| Outer Layer | 32.2 mils | 33.2 mils |
| Weight of Polycarbonate resin in jar | 39.1 gms. | 39.1 gms. |
| Weight of barrier resin in jar | 7.2 gms. | 2.4 gms. |
| $O^2$ Permeability[e] total jar with a surface area of 51.3 sq. in. | 0.153 | 0.010 |
| $H_2O$ permiability[f] total jar with a surface area of 51.3 sq. in. | 0.34 | 0.003 |

[e]The gas permiability is measured in cc/pkg/day. The permiability is measured at room temperature and at one atmosphere of pressure.
[f]The water permiability is measured in g/pkg/day. The permeability is measured at room temperature and at one atmosphere of pressure.

As illustrated by the data in Tables I–V the containers of the instant invention exhibit good gas-barrier properties, can withstand washing in hot caustic solutions, thus rendering them useful in the returnable and reusable bottle industry, have good impact strength, can withstand relatively high temperatures, and retain their dimensional stability. Furthermore, the containers of the instant invention exhibit melt lamination between the three layers.

These properties render the containers of the instant invention suitable as containers for various liquids and foodstuffs. These containers offer the advantages of light weight and good impact strength compared with glass containers. The containers of the instant invention also exhibit greater resistance to degradation due to hot caustic washing solutions compared with the prior art two layer containers.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. A multi-layered hollow container containing at least three layers comprised of:
   (i) a polycarbonate inner layer comprised of at least one ply of a polycarbonate resin;
   (ii) a polycarbonate outer layer comprised of at least one ply of a polycarbonate resin; and
   (iii) an intermediate layer disposed between said inner layer and said outer layer comprised of at least one ply of a thermoplastic resin exhibiting gas-barrier properties.

2. The container of claim 1 wherein said inner layer and said outer layer are melt laminated to said intermediate layer.

3. The container of claim 2 wherein said intermediate layer has a thickness effective for said intermediate layer to function as a gas-barrier layer.

4. The container of claim 3 wherein said thickness is at least about 0.5 mils.

5. The container of claim 2 which is made by a coextrusion blow-molding method.

6. The container of claim 5 wherein the layers are intra die melt-laminated together.

7. The container of claim 3 wherein said intermediate layer is comprised of a resin selected from acrylonitriles, polyesters, and polymers of ethylene and vinyl alcohols.

8. The container of claim 7 wherein said polyester is a copolyester of at least one cycloaliphatic diol and at least one dibasic aromatic carboxylic acid.

9. The container of claim 8 wherein said copolyester is a copolyester of cyclohexane dimethylol and isophthalic and terephthalic acid.

10. The container of claim 9 wherein said polycarbonate is a branched polycarbonate.

11. The container of claim 10 wherein said polycarbonate is a bisphenol-A based polycarbonate.

12. The container of claim 7 wherein said thermoplastic polyester is selected from polyalkylene terephthalates.

13. The container of claim 12 wherein said polyalkylene terephthalate is polyethyelene terephthalate.

14. The container of claim 13 wherein said polycarbonate is a branched polycarbonate.

15. The container of claim 14 wherein said polycarbonate is a bisphenol-A based polycarbonate.

* * * * *